(12) United States Patent
Darnell (10) Patent No.: US 6,902,595 B2
(45) Date of Patent: Jun. 7, 2005

(54) INTAKE WATER SEPARATOR

(75) Inventor: Justin R. Darnell, Southaven, MS (US)

(73) Assignee: Parker-Hannifin Corporation, Cleveland, OH (US)

(*) Notice: Subject to any disclaimer, the term of this patent is extended or adjusted under 35 U.S.C. 154(b) by 15 days.

(21) Appl. No.: 10/624,385

(22) Filed: Jul. 22, 2003

(65) Prior Publication Data

US 2004/0031247 A1 Feb. 19, 2004

Related U.S. Application Data

(60) Provisional application No. 60/403,616, filed on Aug. 14, 2002.

(51) Int. Cl.[7] .............................................. B01D 45/08
(52) U.S. Cl. .......................................... 55/396; 55/462
(58) Field of Search ............................. 55/385.3, 392, 55/396, 462, DIG. 17, DIG. 28

(56) References Cited

U.S. PATENT DOCUMENTS

| | | | | |
|---|---|---|---|---|
| 557,109 | A | * 3/1896 | Cochrane | ...................... 96/263 |
| 1,013,677 | A | * 1/1912 | Mitchell | ...................... 55/396 |
| 1,708,653 | A | 4/1929 | Boyrie | ...................... 55/396 |
| 1,734,723 | A | * 11/1929 | Gildehaus, Jr. | ............ 48/189.2 |
| 2,004,468 | A | * 6/1935 | Hawley | ...................... 55/347 |
| 2,616,519 | A | * 11/1952 | Crankshaw et al. | .......... 55/396 |
| 4,057,075 | A | * 11/1977 | Muschelknautz et al. | ... 137/171 |
| 4,324,573 | A | 4/1982 | Eriksson | ...................... 55/396 |
| 4,365,980 | A | 12/1982 | Culbert et al. | ................ 55/315 |
| 4,811,566 | A | 3/1989 | Silvestri, Jr. et al. | ......... 60/646 |
| 5,800,582 | A | * 9/1998 | Palmer et al. | ................ 55/396 |
| 6,540,802 | B2 | * 4/2003 | Trautmann et al. | ........... 55/337 |
| 6,758,873 | B2 | * 7/2004 | Gieseke et al. | ............... 55/330 |

* cited by examiner

Primary Examiner—Richard L. Chiesa
(74) Attorney, Agent, or Firm—Christopher H. Hunter (57) ABSTRACT

A water separator is formed in two pieces, one of which is unitary (in one piece) with the intake air scoop, and the other of which is unitary (in one piece) with the air cleaner housing, or cowl therefore. An inlet scoop piece includes an enlarged rib defining an internal enlarged channel. A drain tube extends downwardly from the annular rib. An outlet scoop piece includes an internal lip, projecting co-axial with the body of the water separator. The inlet scoop piece alternatively can include both the enlarged rib portion and the internal lip. The outlet scoop piece has a forward-facing receiving channel, outwardly surrounding the lip, which receives a forward facing mouth of the inlet scoop to properly align the inlet scoop with the outlet scoop. Attachment flanges are provided on each piece to connect the inlet scoop with the outlet scoop.

31 Claims, 5 Drawing Sheets

Fig. 5

INTAKE WATER SEPARATOR

CROSS-REFERENCE TO RELATED CASES

The present application claims the benefit of the filing date of U.S. Provisional Application Ser. No. 60/403,616; filed Aug. 14, 2002, the disclosure of which is expressly incorporated herein by reference.

FIELD OF THE INVENTION

The present invention relates generally to intake water separators for separating water from the air intake stream of an internal combustion engine.

BACKGROUND OF THE INVENTION

In many internal combustion engines, an air cleaner is used to remove harmful particulate and other contaminants from an air intake stream before the steam enters the engine. The air cleaner includes filter media which in some instances can degrade or become less efficient in the presence of water. This can cause restriction of the air flow through the cleaner, which can decrease the efficiency of the engine. The water can also carry dirt and salt into the air cleaner which can shorten the life of the filter media. All this can be detrimental to the operation of the engine and can increase operational costs, as well as maintenance and repair costs. As such, some high performance engine applications rely on an intake water separator to remove water in the air stream before the air stream enters the air cleaner.

A water separator is offered by the assignee of the present invention under the mark/designation "Farr In-Line Water Separator", which is a simple, compact, lightweight unit located between the air intake scoop and the air cleaner housing. An annular projecting rib is formed midway along the body of the water separator, and defines an enlarged annular channel interior of the body. An elongated drain tube extends downwardly from the rib, and terminates at its extended lower end in a drain aperture. In a typical installation, the upstream end of the water separator is secured to an inlet pipe at an elbow which causes the water in the moving air to be carried against the interior wall of the separator. The water then collects in the annular channel and drains down into the drain tube, where it can be collected. This configuration of separator has been found to be economical and efficient at separating water from the air flow (up to 90% of the water can be removed if properly installed), and has been widely used in many engine applications.

Other water separators are known which include an internal annular lip projecting co-axial with the body of the separator, in the upstream direction of air flow. The water collects externally of the lip (in the cavity between the lip and the inside walls of the water separator), and drains down into a lower drain tube as described above.

The above-described water separators are typically formed from metal (e.g., steel tube) in, multiple pieces (e.g., two body pieces and a drain tube), which are welded together.

Water separators are typically attached on the upstream side to the air intake scoop via a pipe or tube, and appropriate band clamps are used on the pipe-scoop connection, as well as on the pipe-separator connection. Likewise, on the downstream side, the separator can be fixed directly to the air cleaner housing such as with a clamp, or connected remotely via a tube or pipe. With a remote connection, a pair of band clamps are typically used—one on the pipe-housing connection and one on the pipe-separator connection. The water separator can also be connected directly to a "bonnet", which, itself is held against the air cleaner housing with a strap and a buckle, as shown in U.S. Pat. No. 4,365,980. In any case, there is some installation effort and expense in installing the water separator. There are typically multiple connection points between the water separator, the tubing/hose, and the air intake scoop and air cleaner—each of which requires some sort of fastener such as a band clamp or strap/buckle combination. Since the water separator is a separate and unique component, additional stock keeping units of the separator must be kept on hand, as well as stock keeping units of all the tubing/pipes and fasteners.

In certain current and expected engine applications, the air intake scoop and air cleaner housing are inexpensive, lightweight, plastic components. Locating a separate water separator between the air intake scoop and the air cleaner housing, and plumbing the water separator to both the scoop and the housing, adds undesirable cost, time and weight, and in effect defeats the purpose of minimizing the size and weight of the scoop and housing. The separate water separator, and tubing, band clamps, etc. also take up space, and require sufficient access for installation—all of which requires special consideration in engine design and runs counter to the desire to simplify and reduce the size, weight and cost of the engine.

In light of the above, it is believed there is a demand for a further improved water separator for an engine which is inexpensive, lightweight, simple and compact, and efficiently removes water from an air stream, but which does not require an additional unique component, does not require as much access space as previous designs, and which over-all raises fewer issues in engine design.

SUMMARY OF THE INVENTION

The present invention includes a unique water separator which overcomes many of the drawbacks of prior designs, and is inexpensive, lightweight, simple and compact, and efficiently removes water from an air stream entering an air cleaner.

According to the principles of the present invention, the water separator is formed in two pieces, one of which is formed unitary (in one piece) with the air intake scoop, and the other of which is formed unitary (in one piece) with the air cleaner assembly. One of the pieces, the inlet scoop portion of the water separator, includes a rib portion midway along the separator which defines an internal enlarged channel. In one embodiment, the other piece, the outlet scoop portion of the water separator, includes an internal lip, projecting co-axial with the body of the water separator and defining a water separation cavity with the inner surface of the enlarged internal channel. In a second embodiment, the inlet scoop portion includes both the internal channel and the internal lip. In either case, an elongated drain tube extends downwardly from the rib portion, and water collecting in the water separator drains down through the drain tube for collection or disposal.

The outlet portion in the water separator has a receiving channel, outwardly surrounding the lip and facing forwardly. The channel closely receives a forward-facing mouth of the inlet scoop to properly align the inlet scoop piece with the outlet scoop piece. A pair of attachment flanges are provided on each piece, and when the water separator is assembled, the flanges in the one piece align with the flanges on the other piece, and conventional bolts or clips can be received in openings in the flanges to easily connect the inlet scoop piece to the outlet scoop piece. Other fastening techniques, such as band clamps, can also be used, but preferably, the fastening technique requires only minimal access to the joint between the two pieces, which reduces the overall size of the water separator. In addition, the connecting points are reduced from (at least) two to one compared to prior water separator designs, which also reduces the required access space and number of fasteners. Moreover, forming the water separator as unitary portions of the air intake scoop and filter housing, also reduces the number of stock keeping units necessary for the engine. The water separator pieces are preferably formed from plastic, which makes it easy to form the pieces unitary with the air scoop and the filter housing.

A water separator as described above is inexpensive, lightweight, simple and compact, and efficiently removes water from an air stream entering an air cleaner. The water separator does not require additional stock-keeping units, reduces the required access space for installation and repair/maintenance, and thereby raises fewer issues in engine design.

Further features of the present invention will become apparent to those skilled in the art upon reviewing the following specification and attached drawings.

DETAILED DESCRIPTION OF THE PREFERRED EMBODIMENT

Figure 1:
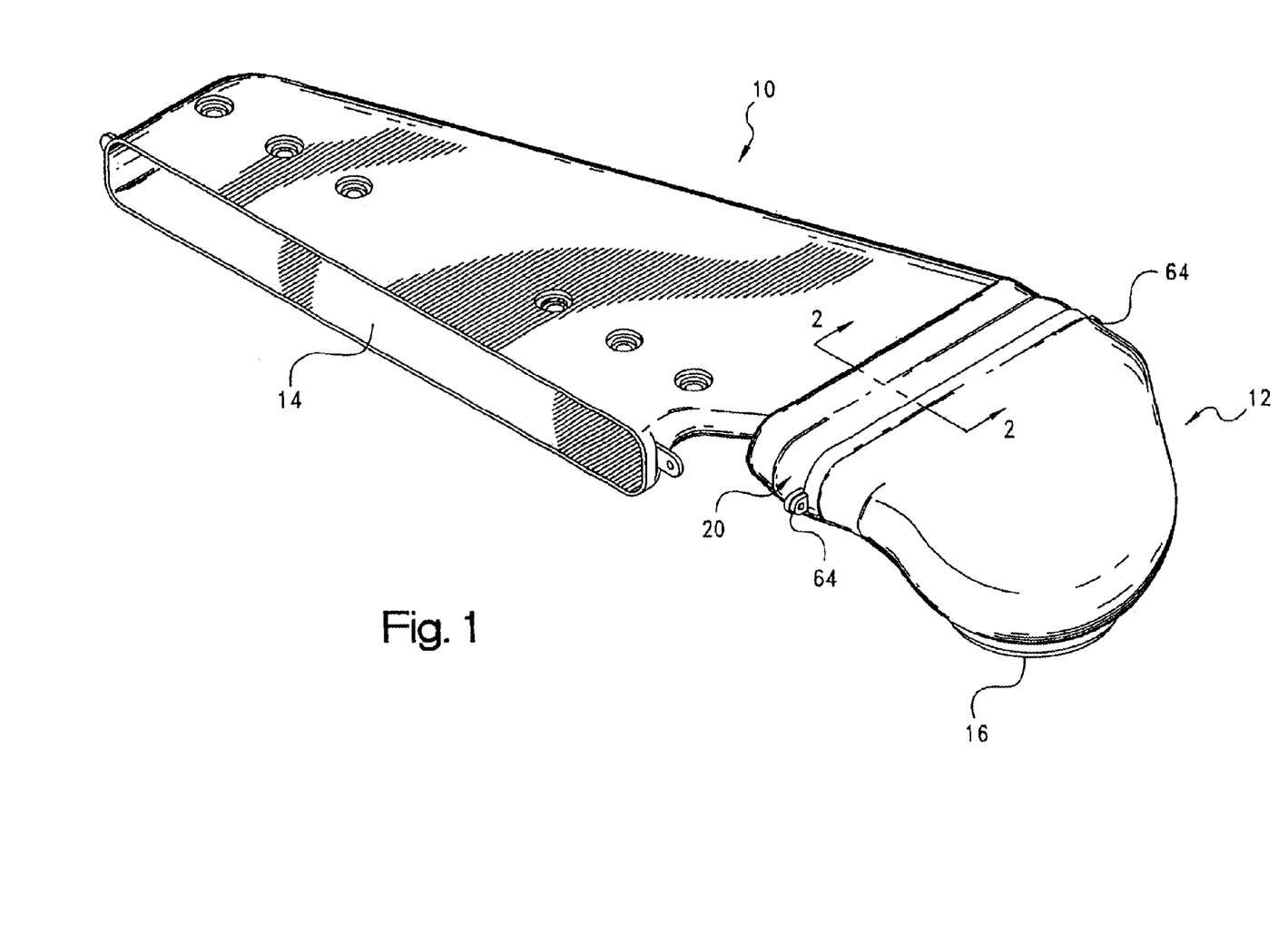
FIG. 1 is a perspective view of an air intake scoop and a cowl to an air cleaner, illustrating a water separator constructed according to the principles of the present invention.

Referring to the drawings, and initially to FIG. 1, certain components of an internal combustion engine are shown, namely, an air intake scoop, indicated generally at 10, and an air cleaner inlet tube or cowl, indicated generally at 12. Air enters a mouth 14 of the inlet air scoop, and passes to an outlet tube 16 of cowl 12 to an engine air cleaner. U.S. Pat. No. 4,365,980, which is incorporated herein by reference, shows and describes an air cleaner appropriate for the present invention, although it is noted that the present invention is useful with a variety of air cleaners. In general, the air intake scoop and air cleaner are generally well-known components and can be of conventional structure, material and function. Preferably, the scoop and the housing of the air cleaner are formed from a lightweight, inexpensive material, such as plastic. The illustrated air intake scoop and air cleaner are useful in a variety of applications, such as high performance engines suitable for automobiles and/or trucks.

Figure 2:
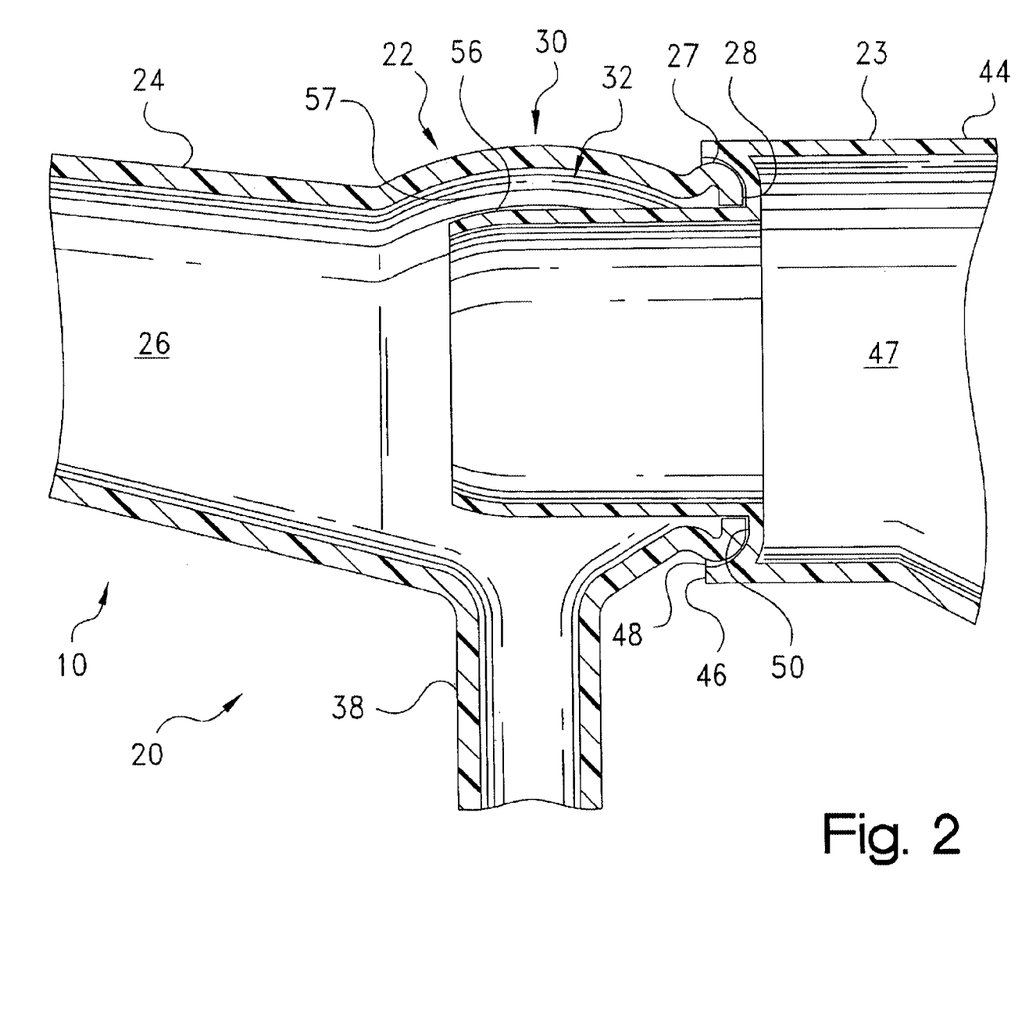
FIG. 2 is a cross-sectional side view of the water separator taken substantially along the plane described by the lines 2–2 of FIG. 1.
Figure 3:
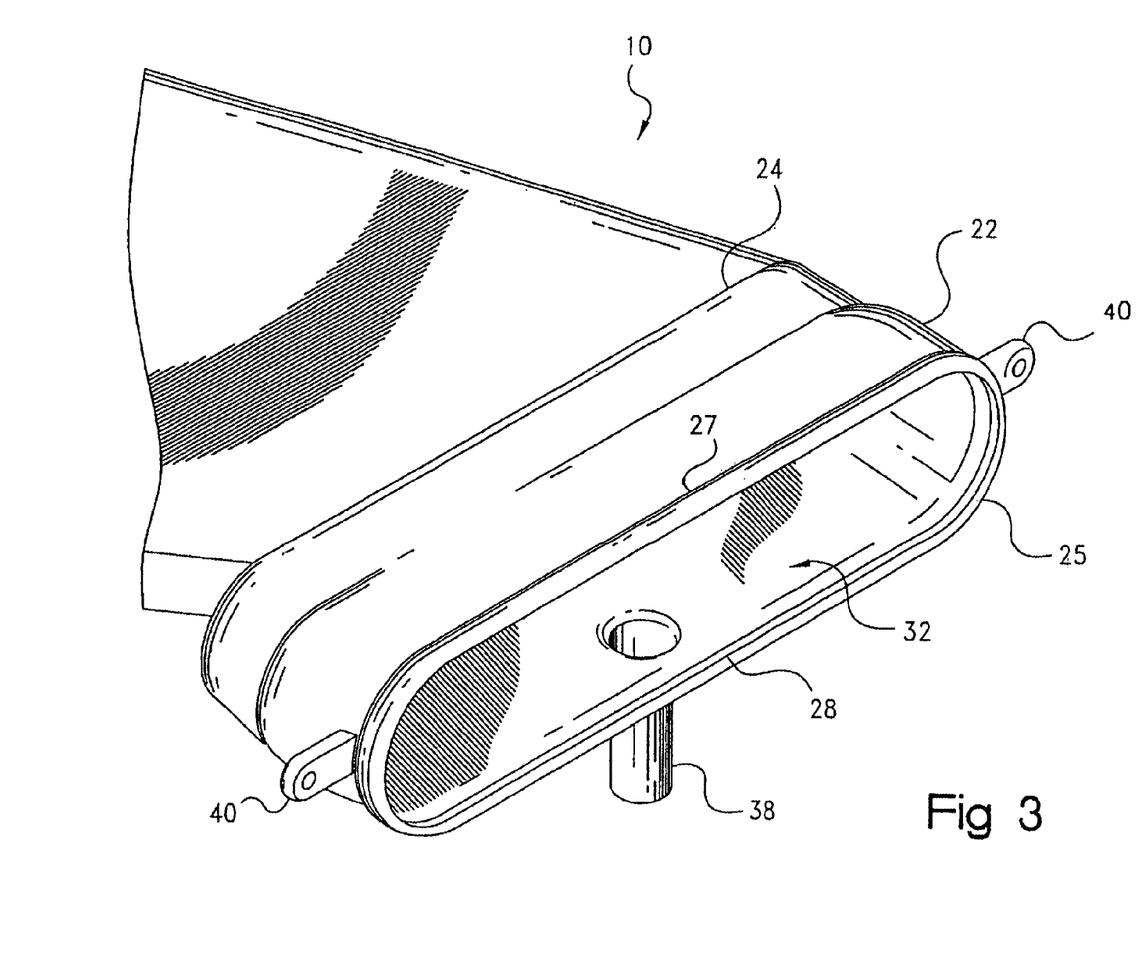
FIG. 3 is an elevated perspective view of the inlet scoop portion of the water separator.
Figure 4:
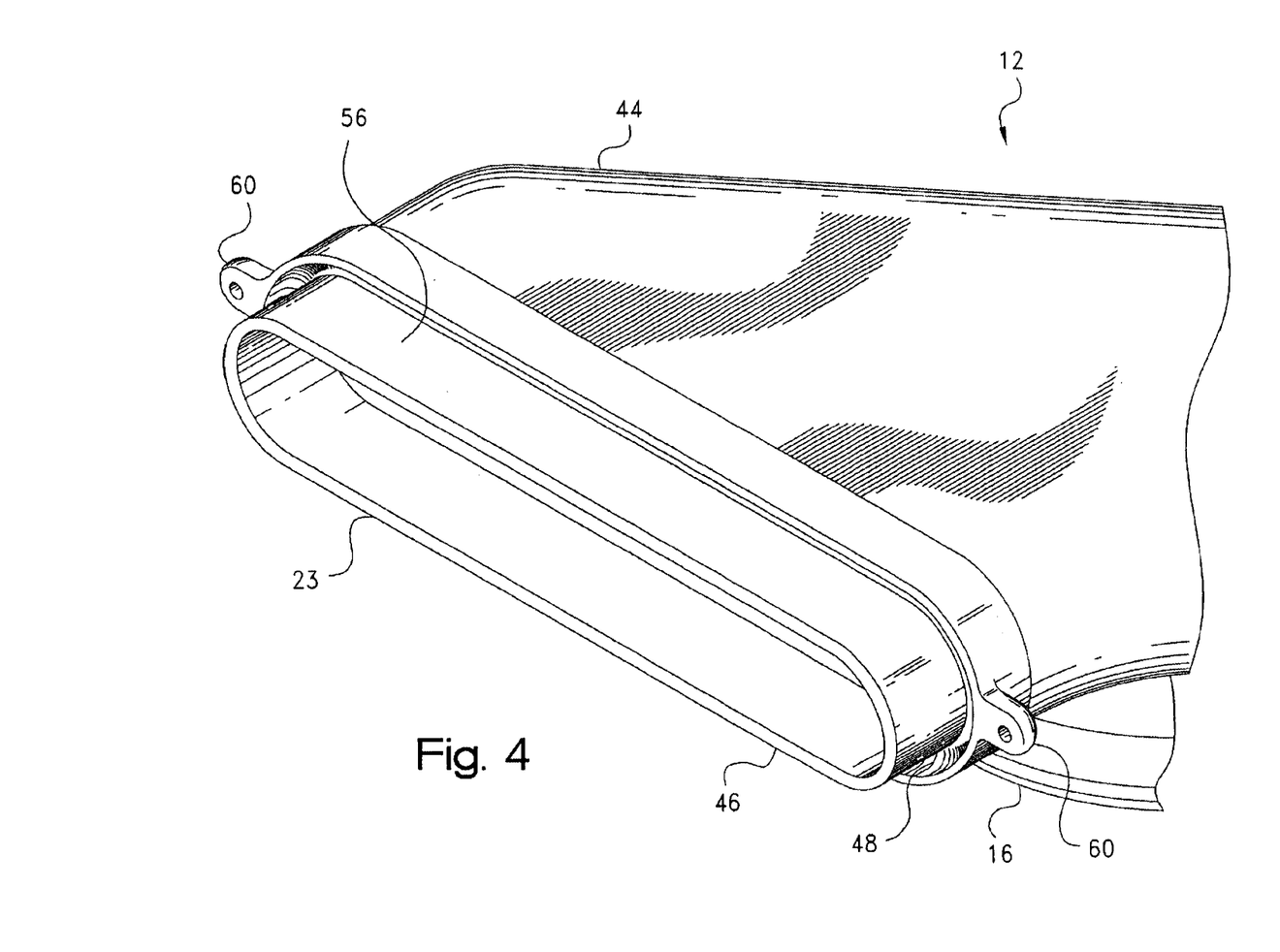
FIG. 4 is an elevated perspective view of the outlet scoop portion of the water separator.

A water separator constructed according to the present invention is indicated generally at 20, and removes water from the air stream entering inlet air scoop 10 before the air stream passes through the outlet tube 16 and reaches the air cleaner. Referring now to FIGS. 2–4, the water separator 20 includes an upstream, inlet scoop piece 22 and a downstream, outlet scoop piece 23. The inlet scoop piece 22 is illustrated as having a generally oval or elliptical body 24 in cross-section, which is dimensioned to be of sufficient size to accommodate the expected air flow to the engine. The body 24 has an open mouth 25 at a forward/downstream end of the body, and a central flow passage 26. The mouth has a radially-outward projecting bead or ridge 27 formed therearound, and an oval/elliptical, flat end surface 28, generally normal to the central axis of the inlet scoop piece. The inlet scoop further has a rib portion, indicated generally at 30, at about the midportion, which defines an internal enlarged oval/elliptical channel, indicated generally at 32, and positioned generally normal to the central axis of the inlet scoop body 24.

An elongated drain tube 38 extends downwardly from the lower end of the rib portion 30. The drain tube 38 can be fluidly connected to a receiving vessel for collection of the water, or can be connected by tubing or hose to ground, to provide a drain path for water collected in the water separator.

A pair of downwardly-projecting attachment flanges 40 are provided on opposite ends of the body 24 of the inlet scoop piece, and include openings for conventional fasteners.

The inlet scoop piece 22 is preferably formed from plastic, in one piece, unitary with the air intake scoop 10. This can occur during the manufacturing process of the air intake scoop, and can be accomplished using any conventional manufacturing technique, such as rotomolding. Alternatively, the inlet scoop piece can be separately formed and then later attached as an integral unit to the air intake scoop; however in this case, it is preferred that the attachment be permanent and secure, such as with adhesive, such that the air intake scoop and inlet scoop piece are a single component prior to assembly with the engine so as to reduce stock keeping units and avoid additional cost and expense in assembling the inlet scoop piece with the air intake scoop on the engine.

While an oval or elliptical configuration for the inlet scoop piece is illustrated, it should be appreciated that the configuration of the inlet scoop piece is primarily dependent on the configuration of the inlet air scoop, and can take configurations other than those which are shown, such as a conventional annular design.

The outlet scoop piece 23 also has an oval or elliptical body 44 in cross-section, similar to the configuration of the inlet scoop piece 22. The body has a mouth 46 at a forward/upstream end of the outlet scoop piece and an internal flow passage 47. The mouth 46 has an oval or elliptical receiving channel 48 opening outwardly/forwardly from the body. The channel 48 has a flat oval/elliptical end wall 50, normal to the central axis of the outlet scoop piece, and generally a configuration which closely receives and bounds bead 27 on the inlet scoop piece (see FIG. 2).

An oval/elliptical lip 56 inwardly bounds the end wall 50 and projects forwardly of channel 48, co-axially with the central axis of outlet scoop body 44. Lip 56 is slightly inwardly-tapered to facilitate inserting the lip through mouth 25 of the inlet scoop piece, and is closely received in the opening defined by end wall 28. The lip 56 and inner surface of the internal channel 32 in the inlet scoop piece define a water collecting cavity 57 opening in the upstream direction in the water separator. The configuration (e.g., length) of the lip 56, and size of cavity 57 may vary depending on the particular application, as should be appreciated by those skilled in the art.

A pair of outwardly-projecting attachment flanges 60 are provided on opposite ends of the body 44 of the outlet scoop piece, and include openings for conventional fasteners.

The outlet scoop piece 23 is preferably also formed from plastic, in one piece, unitary with the cowl 12 of the air cleaner. As with the inlet scoop piece, this can occur during the manufacturing process of the cowl; and can be accomplished in the same manner, such as rotomolding. Alternatively, the outlet scoop piece can be separately formed and then later attached as an integral unit to the cowl; however again, in this case, it is preferred that the attachment be permanent and secure, such as with adhesive, such that the cowl and outlet scoop piece be a single component prior to assembly with the engine so as to reduce stock keeping units and avoid additional cost and expense in assembling the outlet scoop piece with the cowl. The outlet scoop piece could also be formed directly and unitarily with the housing of the air cleaner, or with some other component of the air cleaner assembly.

When the inlet scoop piece 22 is assembled with the outlet scoop piece 23, the mouth 25 of the inlet scoop piece 22 is closely received in the channel 48 of the outlet scoop piece, with the cooperation between the closely-fitting components properly, easily and quickly aligning the inlet scoop piece 22 with the outlet scoop piece 23. The mouth 25 of the inlet scoop piece is inwardly and outwardly bounded and supported, with the mouth 46 of the outlet scoop piece closely receiving the outer diameter of bead 27, and the lip 56 closely inwardly bounding end wall 28. The flat formed end wall 28 of the inlet scoop piece sits flush against the flat end wall 50 of the channel in the outlet scoop piece. When the components are so aligned, the flanges 40 on the inlet scoop piece 22 become properly aligned with the flanges 60 on the outlet scoop piece 23, and fasteners 64, such as bolts or clips can be inserted through the respective openings to securely fix the inlet scoop piece to the outlet scoop piece. Other fasteners rather than bolts or clips can of course be used (for example a band clamp), as long as such fasteners preferably are simple and easy to use, and do not require significant access on the engine to minimize the space necessary for the water separator.

As should be appreciated, air passing into the central passage 26 of the inlet scoop piece of the water separator 20 from the air inlet scoop may contain moisture or water, which will migrate against the walls of the water separator. The water enters the water separation cavity 57, collects in the internal channel 32, and drains downwardly into the drain tube 38, where it can be collected or disposed of. The tapered lip of the outlet scoop body 44 increases the efficiency of water removal in the water separator. The essentially water-free air then passes through the central passage 47 in the outlet scoop piece to the air cleaner.

Figure 5:
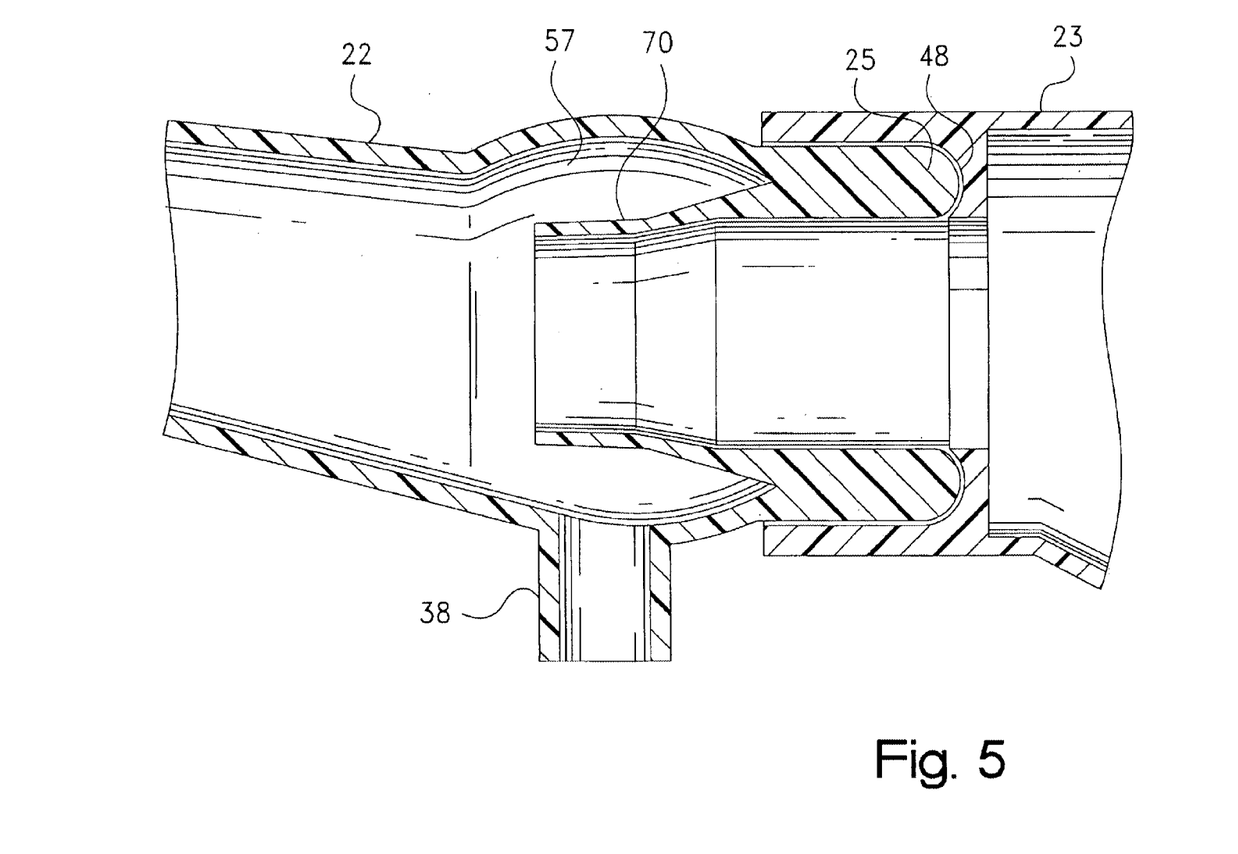
FIG. 5 is a cross-sectional side view of a second embodiment of the water separator of the present invention.

A second embodiment of the water separator is shown in FIG. 5. In this embodiment, the water separation feature of the water separator is provided with the inlet scoop piece 22, rather than the outlet scoop piece 23. Specifically, a lip 70 is provided integral (unitary) with the mouth 25 of the inlet scoop piece, rather than with the outlet scoop piece, and projects rearwardly therefrom to define the upstream-facing water separation cavity 57. The mouth 25 otherwise is closely received in the channel 48 at the forward end of the outlet scoop piece 23, with the channel configured to both inwardly and outwardly bound and support the mouth 25. The remaining structure of the inlet scoop piece and outlet scoop piece is preferably the same as in the first embodiment described above.

While the water separator of the present invention is particularly useful for separating water in the air flow between an air scoop intake and an air cleaner in an internal combustion engine, the separator could be used in other applications to remove a first, heavier fluid (such as a liquid); from a second, lighter fluid (such as a vapor or gas). Such applications include, but are not limited to: i) removing water from steam; and ii) removing oil from compressed air. As such, the present invention should be broadly construed as applicable to a variety of applications and not limited to the particular example described herein.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A fluid separator for separating a first, heavier fluid from a second, lighter fluid in a fluid stream, comprising i) an inlet scoop piece with a body having a rib portion defining an enlarged internal channel, a drain tube at a lower end of the rib portion, and a mouth at a forward end of the inlet scoop body; and ii) an outlet scoop piece with a body having a receiving channel at a forward end of the outlet scoop piece dimensioned to closely receive the mouth of the inlet scoop piece and outwardly bound and support the mouth; and a lip located internally of the inlet scoop piece and defining a fluid separation cavity with an inner surface of the internal channel, and a flow passage through the inlet scoop piece and the outlet scoop piece, wherein heavier fluid passing through the flow passage separates out in the fluid separation cavity, collects in the internal channel, and drains down through the drain tube.

2. The fluid separator as in claim 1, wherein the inlet scoop piece is outwardly bounded and supported by an inner wall of the outlet scoop piece, and inwardly bounded and supported by an outer wall of the lip.

3. The fluid separator as in claim 2, wherein the mouth of the inlet scoop piece has a radially-outward projecting bead therearound, and the receiving channel of the outlet scoop piece closely receives the outer diameter of the bead, and the lip closely inwardly bounds an inner diameter of the mouth.

4. The fluid separator as in claim 3, wherein the mouth of the inlet scoop piece has a flat forward end, and the receiving channel of the outlet scoop piece has a flat end wall, the mouth of the inlet scoop piece being received in the receiving channel such that the forward end of the inlet scoop piece is flush against the end wall of the receiving channel.

5. The fluid separator as in claim 1, further including a pair of attachment flanges on the inlet scoop piece and a pair of attachment flanges on the outlet scoop piece, the flanges on the inlet scoop piece being aligned with the flanges on the outlet scoop piece, and fasteners associated with the flanges securing the inlet scoop piece to the outlet scoop piece.

6. The fluid separator as in claim 1, wherein the inlet scoop piece and the outlet scoop piece are each unitary components.

7. The fluid separator as in claim 1, wherein the mouth of the inlet scoop piece has a rounded forward end, and the receiving channel has a complementary rounded interior configuration closely receiving the mouth.

8. The fluid separator as in claim 1, wherein the mouth of the inlet scoop piece has a bead therearound, and the receiving channel of the outlet scoop piece closely receives an outer diameter of the bead, and the lip closely inwardly bounds an inner diameter of the mouth.

9. The fluid separator as in claim 1, wherein the lip is unitary with the inlet scoop piece.

10. The fluid separator as in claim 3, wherein the bead of the inlet scoop piece has an end wall facing radially inward into the internal channel, and the lip inwardly bounds and supports the end wall.

11. A water separator for removing water from an air stream for an internal combustion engine, said water separator including i) an inlet scoop piece with a body having a rib portion defining an enlarged internal channel, a drain tube at a lower end of the rib portion, and a mouth at a forward end of the inlet scoop body; and ii) an outlet scoop piece with a body having a receiving channel at a forward end of the outlet scoop piece dimensioned to closely receive the mouth of the inlet scoop piece and radially inwardly and radially outwardly bound and support the mouth, and a lip projecting outwardly from the forward end of the outlet scoop piece and closely received in the mouth of the inlet scoop piece, the inlet scoop piece and outlet scoop piece being assembled together such that a water separation cavity is defined between the lip and the internal channel, and when the pieces are so assembled, a flow passage defined through the pieces which causes water in the air stream through the flow passage to separate out in the water separation cavity, collect in the internal channel, and drain down through the drain tube.

12. The water separator as in claim 11, wherein the inlet scoop piece is outwardly bounded and supported by an inner wall of the outlet scoop piece, and inwardly bounded and supported by an outer wall of the lip.

13. The water separator as in claim 12, wherein the mouth of the inlet scoop piece has a radially-outward projecting bead therearound, and the receiving channel of the outlet scoop piece closely receives the outer diameter of the bead, and the lip closely inwardly bounds an inner diameter of the mouth.

14. The water separator as in claim 13, wherein the mouth of the inlet scoop piece has a flat forward end, and the receiving channel of the outlet scoop piece has a flat end wall, the mouth of the inlet scoop piece being received in the receiving channel such that the forward end of the inlet scoop piece is located flush against the end wall of the channel.

15. The water separator as in claim 11, further including a pair of attachment flanges on the inlet scoop piece and a pair of attachment flanges on the outlet scoop piece, the flanges on the inlet scoop piece being aligned with the flanges on the outlet scoop piece, and fasteners associated with the flanges securing the inlet scoop piece to the outlet scoop piece.

16. The water separator as in claim 11, wherein the inlet scoop piece and the outlet scoop piece are each unitary components.

17. The water separator as in claim 11, wherein the mouth of the inlet scoop piece has a rounded forward end, and the receiving channel has a complementary rounded interior configuration closely receiving the mouth.

18. The water separator as in claim 11, wherein the mouth of the inlet scoop piece has a bead therearound, and the receiving channel of the outlet scoop piece closely receives an outer diameter of the bead, and the lip closely inwardly bounds an inner diameter of the mouth.

19. The water separator as in claim 13, wherein the bead of the inlet scoop piece has an end wall facing radially inward into the internal channel, and the lip inwardly bounds and supports the end wall.

20. A water separator for removing water from an air stream for an internal combustion engine, said water separator including i) an inlet scoop piece with a body having a rib portion defining an internal enlarged channel, a drain tube at a lower end of the rib portion, and a mouth at a forward end of the inlet scoop piece; and ii) an outlet scoop piece with a body having a receiving channel at a forward end dimensioned to closely receive the mouth of the inlet scoop piece and radially inwardly and radially outwardly bound and support the mouth; and an internal lip projecting from the mouth of the inlet scoop piece rearwardly within the inlet scoop piece, the lip and the internal channel in the inlet scoop piece defining a water separation cavity, and when the pieces are so assembled, a flow passage through the pieces which causes water in the air stream to separate out in the water separation cavity, collect in the internal channel, and drain down through the drain tube.

21. The water separator as in claim 20, wherein the inlet scoop piece is outwardly bounded and supported by an inner wall of the outlet scoop piece.

22. The water separator as in claim 21, further including a pair of attachment flanges on the inlet scoop piece and a pair of attachment flanges on the outlet scoop piece, the flanges on the inlet scoop piece being aligned with the flanges on the outlet scoop piece, and fasteners associated with the flanges securing the inlet scoop piece to the outlet scoop piece.

23. The water separator as in claim 20, wherein the inlet scoop piece and the outlet scoop piece are each unitary components.

24. The water separator as in claim 20, wherein the mouth of the inlet scoop piece has a rounded forward end, and the receiving channel has a complementary rounded interior configuration closely receiving the mouth.

25. The water separator as in claim 20, wherein the lip is unitary with the inlet scoop piece.

26. A water separator for removing water from an air stream for an internal combustion engine, wherein the engine includes an inlet air scoop and an air cleaner assembly, the water separator including i) an upstream inlet scoop piece unitary with the inlet air scoop and having a body with a rib portion defining an enlarged internal chamber, an elongated drain tube at a lower end of the rib portion, and a mouth at a downstream end of the inlet scoop body; and ii) a downstream outlet scoop piece unitary with the air cleaner assembly, and having a body with a receiving channel at an upstream end dimensioned to closely receive the mouth of the inlet scoop piece and radially inwardly and radially outwardly bound and support the mouth; and a lip located internally of the inlet scoop piece and defining a water separation cavity with an inner surface of the internal channel opening in the upstream direction, and a flow passage through the inlet scoop piece and the outlet scoop piece, wherein water in the air stream passing downstream through the flow passage separates out in the water separation cavity, collects in the internal channel, and drains out through the drain tube, and essentially water-free air continues to the air cleaner assembly.

27. The water separator as in claim 26, wherein the inlet scoop piece is outwardly bounded and supported by an inner wall of the outlet scoop piece, and inwardly bounded and supported by an outer wall of the lip.

28. The water separator as in claim 27, wherein the mouth of the inlet scoop piece has a bead therearound, and the receiving channel of the outlet scoop piece closely receives the outer diameter of the bead, and the lip closely inwardly bounds an inner diameter of the mouth.

29. The water separator as in claim 28, wherein the bead of the inlet scoop piece has an end wall facing radially inward into the internal channel, and the lip inwardly bounds and supports the end wall.

30. The water separator as in claim 26, wherein the mouth of the inlet scoop piece has a rounded forward end, and the receiving channel has a complementary rounded interior configuration closely receiving the mouth.

31. The water separator as in claim 26, wherein the lip is unitary with the inlet scoop piece.

* * * * *